United States Patent
Overby et al.

(10) Patent No.: US 8,099,529 B1
(45) Date of Patent: Jan. 17, 2012

(54) SOFTWARE BASED NATIVE COMMAND QUEUING UTILIZING DIRECT MEMORY ACCESS TRANSFER CONTEXT INFORMATION

(75) Inventors: Mark A. Overby, Bothell, WA (US); Xing Cindy Chen, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 12/608,833

(22) Filed: Oct. 29, 2009

Related U.S. Application Data

(62) Division of application No. 11/248,663, filed on Oct. 12, 2005, now Pat. No. 7,620,747.

(51) Int. Cl.
G06F 13/28 (2006.01)
G06F 3/00 (2006.01)
(52) U.S. Cl. ............... 710/22; 710/28; 710/36
(58) Field of Classification Search ........... 710/22, 710/28, 36
See application file for complete search history.

(56) References Cited

U.S. PATENT DOCUMENTS
7,366,958 B2 * 4/2008 Marushak et al. ............ 714/43

OTHER PUBLICATIONS
Intel, Serial ATA II Native Command Queuing Overview, Application Note, Apr. 2003, pp. 1-21.*

* cited by examiner

*Primary Examiner* — Alford W. Kindred
*Assistant Examiner* — Zachary K Huson
(74) *Attorney, Agent, or Firm* — Patterson & Sheridan, LLP

(57) ABSTRACT

Systems and methods for performing native command queuing according to the protocol specified by Serial ATA II for transferring data between a disk and system memory are described. Native command queuing context for queued commands is maintained by a host controller device driver and is provided to the host controller as needed to process the queued commands. The host controller is simplified since it only stores the context of the one command being processed. The host controller generates a backoff interrupt when a command cannot be queued. The host controller generates a DMA transfer context request interrupt to request programming of the registers that store the context for the one command being processed.

14 Claims, 4 Drawing Sheets

SOFTWARE BASED NATIVE COMMAND QUEUING UTILIZING DIRECT MEMORY ACCESS TRANSFER CONTEXT INFORMATION

CROSS-REFERENCE TO RELATED APPLICATIONS

This application is a divisional of U.S. patent application Ser. No. 11/248,663, filed Oct. 12, 2005 now U.S. Pat. No. 7,620,747, which is hereby incorporated herein by reference.

BACKGROUND OF THE INVENTION

1. Field of the Invention

One or more aspects of the invention generally relate to native command queuing for host controllers that use the serial ATA (SATA) II protocol, and more particularly to software based implementations of native command queuing.

2. Description of the Related Art

The serial ATA II disk access protocol improves disk access performance by permitting queuing of commands to transfer data between system memory and one or more disks. When the commands are queued, each disk within a system is able to process the disk accesses in an order based on the head position, reordering commands to minimize disk head repositioning and rotational delay. A conventional host controller includes logic to perform the native command queuing feature. Specifically, the queued command state is stored and maintained within the conventional host controller. Furthermore, the logic also performs setup for each direct memory access (DMA) transfer between the system memory and a disk. Including this logic within the conventional host controller increases the die area of the device, thereby increasing the cost of the device.

Accordingly, it is desirable include support for native based command queuing in a host controller for use with SATA II disks to improve disk access performance. It is also desirable to minimize the die area needed to include support for native based command queuing in the host controller to reduce the cost of the host controller.

SUMMARY OF THE INVENTION

The current invention involves new systems and methods for performing the native command queuing protocol conforming to the SATA II standard. A direct memory access (DMA) transfer context is maintained for each queued command by a host controller device driver and is provided to the host controller as needed to process the queued commands. The host controller is simplified since it only stores the DMA transfer context of the queued command being processed. The host controller generates a DMA setup request interrupt to request programming of the DMA transfer context (bus master setup) registers within the host controller that are needed to process a queued read or write command.

Various embodiments of the invention include a system for performing disk transfers between system memory and a disk using a native command queuing protocol for Serial ATA II. The system includes the system memory configured to store data, the disk, a central processing unit coupled to the system memory, and a host controller coupled between the central processing unit and the disk. The disk is configured to process queued commands according to the native command queuing protocol, wherein the queued commands specify transfers of a portion of the data between the system memory and the disk. The host controller is configured to generate interrupts to indicate a backoff condition exists or to request direct memory access (DMA) transfer context for one of the queued commands.

Various embodiments of the invention include a method for performing disk transfers using a native command queuing protocol for SATA II including receiving a direct memory access (DMA) setup frame information structure (FIS) from a disk, generating an interrupt, receiving bus master control register values, and transferring data between the disk and a portion of system memory to complete the processing of the queued command. The received DMA Setup FIS includes a tag corresponding to a queued command for processing using the native command queuing protocol. The interrupt indicates that a DMA transfer context to process the queued command corresponding to the tag is needed and the bus master control register values provide the DMA transfer context.

Various embodiments of the invention include a computer-readable medium containing a program which, when executed by a computing device, configures a host controller to perform a process for performing disk transfers using a native command queuing protocol for Serial ATA II. The process includes receiving a direct memory access (DMA) transfer context interrupt from the host controller indicating that a DMA transfer context is needed for a queued command, determining the DMA transfer context corresponding to the queued command, and outputting a register write command to the host controller, wherein the register write command includes bus master control register values for the DMA transfer context.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The present invention provides a means for performing native command queuing using a combination of software and hardware. Native command queuing state is maintained by a host controller device driver and is provided to the host controller as needed to process the queued commands. The host controller is simplified and requires less die area than a conventional implementation of a host controller that stores and maintains the state of each queued command. Instead the host controller of the present invention stores the state of the command being processed. The host controller generates a DMA setup request interrupt to request programming of the registers needed to process a queued read or write command. Unlike a conventional host controller, the host controller generates a backoff interrupt when a command submitted by the host controller device driver cannot be issued to the disk because the disk also wants to acquire the SATA II bus at around the same time to transfer an FIS to the host controller and the disk always wins over the host controller when there is a conflict. In contrast, a conventional host controller does not generate an interrupt, but instead reissues the command without software intervention once the SATA II bus is available.

Figure 1:
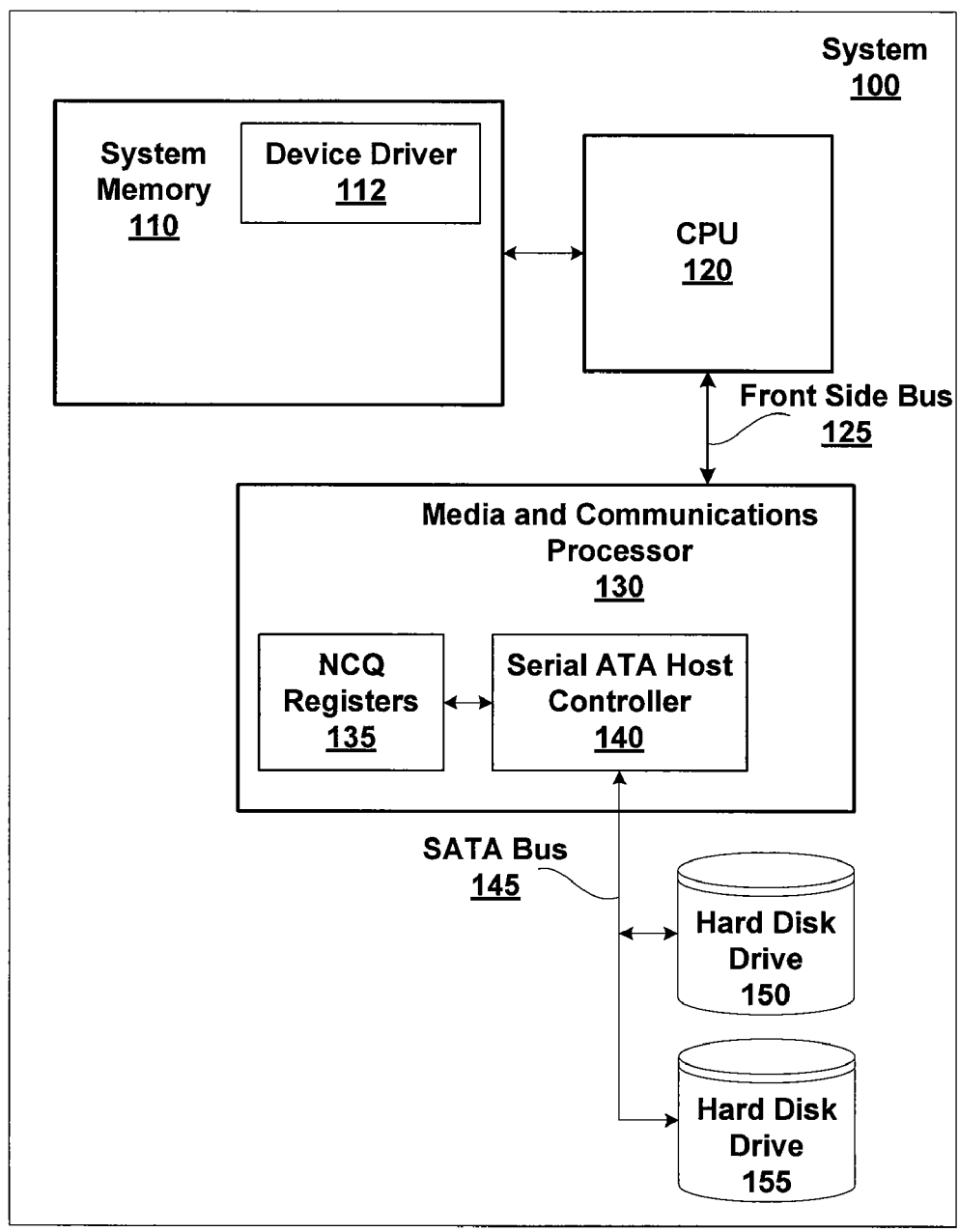
FIG. 1 is a block diagram of an exemplary embodiment of a respective computer system in accordance with one or more aspects of the present invention including a CPU and hard disk drives.

FIG. 1 is a block diagram of an exemplary embodiment of a respective computer system, a system 100, in accordance with one or more aspects of the present invention including a CPU 120 and hard disk drives 150 and 155. Hard disk drives 150 and 155 conform with the SATA II standard and therefore, use the native command queuing protocol. System 100 includes a system memory 110 for storing programs and data used by CPU 120, including data that may be read from or written to hard disk drives 150 and 155.

System 100 may be a desktop computer, server, laptop computer, palm-sized computer, tablet computer, game console, portable wireless terminal such as a personal digital assistant (PDA) or cellular telephone, computer based simulator, or the like. CPU 120 may include a system memory controller to interface directly to system memory 110. In alternate embodiments of the present invention, CPU 120 may communicate with system memory 110 through a system interface, e.g., I/O (input/output) interface or a bridge device.

A device driver 112 is stored in system memory 110. Device driver 112 is provided by the system designer and/or manufacturer of system 100 and is configured to interface between an operating system (not shown) running on CPU 120 and a media and communications processor 130. Media and communications processor 130 is coupled between CPU 120 and one or more hard disk drives, such as hard disk drives 150 and 155. Media and communications processor 130 is coupled to CPU 120 by a high bandwidth front side bus 125. In some embodiments of the present invention, media and communications processor 130 interfaces with CPU 120 over front side bus 125 using a peripheral component interface (PCI) HyperTransport™ Protocol.

Media and communications processor 130 facilitates data transfers between system memory 110 and one or more hard disk drives and includes a SATA host controller 140 that is coupled to one or more hard disk drives 150 and 155 via a SATA bus 145. Hard disk drives 150 and 155 are configured to support serial ATA II native command queuing. Each hard disk drive 150 and 155 includes drive electronics that control storing and reading of data within the individual hard disk drive. SATA host controller 140 is coupled to native command queuing (NCQ) registers 135. NCQ registers include bus master control registers configured to store values for the DMA transfer context of a queued command. NCQ registers also include registers used to provide DMA setup frame information structure (FIS) information to device driver 112. The DMA setup FIS information is used by device driver 112 to determine the values to write to the bus master control registers, thereby providing the DMA transfer context for a queued command.

In other embodiments of the present invention, media and communications processor 130 may include additional ports such as universal serial bus (USB), accelerated graphics port (AGP), and the like. Each hard disk drive 150 or 155 may be replaced or removed, so at any particular time, system 100 may include fewer or more hard disk drives.

Figure 2:
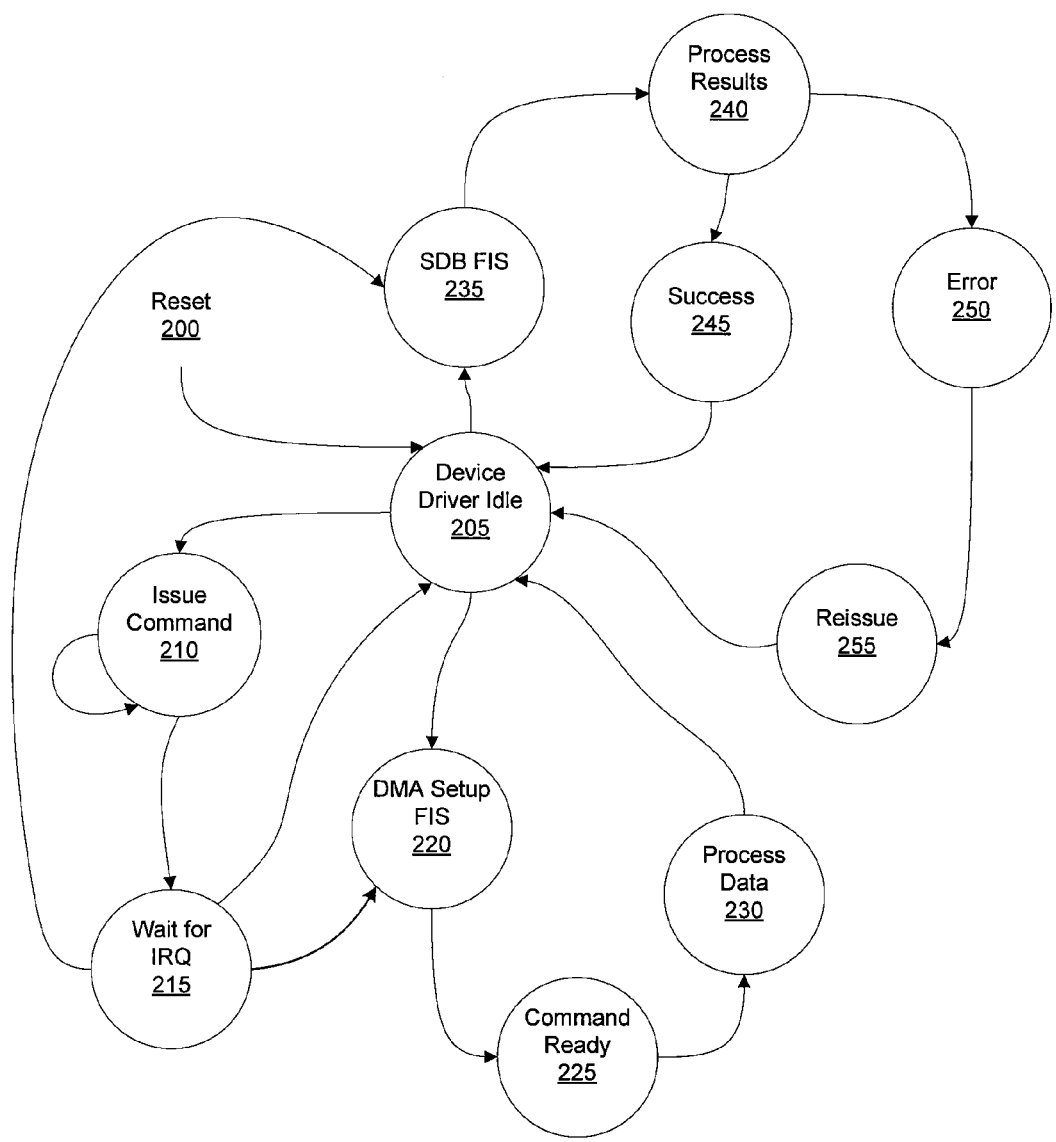
FIG. 2 is an exemplary embodiment of a state machine for performing native command queuing of disk commands in accordance with one or more aspects of the present invention.

FIG. 2 is an exemplary embodiment of a state machine for performing the native command queuing protocol specified by SATA II in accordance with one or more aspects of the present invention. The state machine of FIG. 2 illustrates an embodiment of the protocol performed by a combination of device driver 112 and SATA host controller 140. Device driver idle 205 state is entered when a reset 200 is received or when SATA host controller 140 has completed processing of a queued command. When device driver 112 needs to issue a new command, e.g., a read or write FPDMA command, the state machine transitions from host controller idle 205 to issue command 210. Prior to issuing a command, device driver 112 checks that an interrupt has not been generated by SATA host controller 140.

In the issue command 210 state, parameters for the command are written to shadow registers within NCQ registers 135. A bit in an SACTIVE register in NCQ registers 135 is also asserted that corresponds to a tag associated with the command. Device driver 112 polls a status register and the state machine remains in the issue command state 210 until the BSY bit is cleared. Once the BSY bit is cleared, the state machine transitions to the wait for IRQ 215 state.

In the IRQ 215 state device driver 112 is waiting for SATA host controller 140 to generate an interrupt to indicate that the command was accepted. SATA host controller 140 receives a Device to Host register FIS with the I bit set and copies the I bit from the command into a register in NCQ registers 135, generating a device to host register FIS interrupt. Device driver 112 clears the device to host register FIS interrupt bit and the state machine transitions to host controller idle 205. If SATA host controller 140 starts sending the command and must back-off because the disk transmitted at the same time, the command cannot be sent to the disk and will be reissued by device driver 112 at a later time. SATA host controller 140 generates a backoff interrupt indicating to device driver 112 that the command was not queued and must be reissued by device driver 112 when SATA host controller 140 detects a conflict on the link, e.g., SATA bus 145. The disk (hard disk drive 150 or 155) always wins arbitration of SATA bus 145 when both the SATA host controller 140 and hard disk drive 150 or 155 needs access to the SATA bus according to the SATA protocol.

When a backoff interrupt is received, device driver 112 transitions to the Device Driver Idle 205 state and prepares to reissue the command. A backoff interrupt is not the only indication of a bus access conflict, i.e., that a backoff condition exists. Device driver 112 also reissues commands in response to a backoff condition when a DMA setup FIS interrupt or a SDB FIS interrupt is received and device driver 112 is in the WaitForIRQ 215 state. When a DMA setup FIS is received, this means that the disk is in a state to serve a previously issued command before SATA host controller 140 can send the new command to hard disk drive 150 or 155. When a DMA setup FIS interrupt is received, device driver 112 will transition from WaitForIRQ 215 state to DMA Setup FIS state 220 and will reissue the command at a later time after having processed the DMA setup FIS. When an SDB FIS interrupt is received, this means that hard disk drive 150 or 155 has already sent an SDB FIS for a previously issued command before SATA host controller 140 can send out the new command to the disk. When an SDB FIS interrupt is received, device driver 112 will transition from WaitForIRQ 215 state to SDB FIS. 235 and will reissue the command at a later time after having processed the SDB FIS.

DMA setup FIS. 220 may also be entered from host controller idle 205 when a DMA setup FIS is received from a disk, such as hard disk drive 150 or 155, and a command is not received from device driver 112. A conventional host controller does not generate an interrupt, e.g., backoff interrupt, DMA setup FIS interrupt, SDB FIS interrupt, or the like, since the conventional host controller reissues a command, without software intervention, whenever there is a conflict between the conventional host controller and a disk transmitting on a SATA bus. An advantage of the present invention is that SATA host controller 140 is logically simplified since it does not have to reissue commands.

While in the DMA setup FIS. 220 state, SATA host controller 140 copies the DMA offset, DMA length, D bit, I bit, and tag value from the DMA setup FIS into the shadow FIS registers in NCQ registers 145. SATA host controller 140 then generates a DMA transfer context request interrupt to indicate to device driver 112 that the DMA context is needed to process the queued command corresponding to the tag and transitions to the state command ready 225. In a conventional host controller, the context for each queued command is stored within the conventional host controller and is not provided by software.

In state command ready 225 device driver 112 clears the DMA transfer context request interrupt bit (DMA_SETUP in Table 1 below) and determines bus master register values. The bus master register values include information from the scatter gather lists stored in system memory 110. Device driver 112 writes bus master registers within NCQ registers 135 with the bus master register values and writes a 1 to bit 0 of a bus master command register (asserting the bus master start/stop bit) within NCQ registers 135 and transitions to state process data 230. In some embodiments of the present invention, the bus master control register values are stored in registers configured to store parallel ATA parameters.

In state process data 230 SATA host controller 140 processes data received via SATA bus 145 from the disk which produced the DMA setup FIS. Once all of the data has been processed for the DMA setup FIS, SATA host controller 140 transitions to host controller idle 205.

When SATA host controller 140 receives a Set Device Bits FIS from a disk, SATA host controller 140 transitions from host controller idle 205 to SDB FIS. 235. SATA host controller 140 updates the shadow registers in NCQ registers 135 with the contents of the SDB FIS, indicating which queued command(s) have been completed, and updates the SACTIVE register as specified in the SATA II specification. SATA host controller 140 then generates an SDB FIS interrupt and transitions to the process results 240 state. In process results 240 device driver 112 reads the shadow status register in NCQ registers 135 to determine which of the queued command(s) were completed, clears the SDB FIS interrupt bit, and clears bit 0 of the bus master command register in NCQ registers 135. The state machine transitions from process results 240 to success 245 when the ERR bit in the shadow status register is not asserted. The state machine transitions from process results 240 to error 250 when the ERR bit is asserted.

In success 245 device driver 112 indicates to the OS that the queued commands were successfully completed after reading the SACTIVE register in NCQ registers 135 to determine which queued command(s) were completed. The state machine transitions from success 245 to host controller idle 205. In error 250 one or more queued commands may have completed successfully, therefore device driver reads the SACTIVE register in NCQ registers 135 to determine which, if any, queued command(s) were completed. Device driver 112 will also determine which queued command failed by issuing a read log ext command to the disk to retrieve the error log page. Device driver 112 then transitions from error 250 to reissue 255 and signals failure of the queued command that was not completed successfully and reissues any uncompleted queued commands. Once all of the uncompleted commands have been reissued, device driver 112 transitions to host controller idle 205.

NCQ registers 135 includes several registers for performing the native command queuing protocol. Specifically, shadow registers, bus master registers, and the registers described in Table 1 below. The registers of Table 1 are included for each channel (SATA Bus 145). Serial ATA Host controller 140 may include one or more channels and each channel may be used to interface to one or more hard disk drives.

TABLE 1

| Field Name | Size | R/W | Usage |
|---|---|---|---|
| DH_REGFIS | 1 b | R/W | A 1 indicates that there is an interrupt for the channel caused by receiving a Device to Host Register FIS |
| DMA_SETUP | 1 b | R/W | A 1 indicates that there is an interrupt for the channel caused by receiving a DMA Setup FIS from a disk |
| SDB_FIS | 1 b | R/W | A 1 indicates that there is an interrupt for the channel caused by receiving a Set Device Bits FIS from a disk |
| TX_BACKOUT | 1 b | R/W | A 1 indicates that the command written to shadow register was not successfully queued (output to a disk) |
| Intr_en_mas | 4 b | R/W | Enable mask bits for all the above interrupts. So a "1" will generate an interrupt and a "0" will mask it. |
| Tag | 5 b | R | Tag field from the DMA Setup FIS |
| D | 1 b | R | D bit from DMA Setup FIS |
| I | 1 b | R | I bit from DMA Setup FIS |
| Buffer_Offset | 32 b | R | DMA Buffer Offset field from DMA Setup FIS |
| Transfer_Count | 32 b | R | DMA Transfer Count field from DMA Setup FIS |
| SActive | 32 b | R/W | Bit significant. Each bit position represents the status of a pending queued command with a corresponding TAG value. A 1 at bit n indicates that the command with TAG n is still outstanding. Device driver 112 sets the bits when issuing a command. The set bits are cleared by SATA host controller 140 based on the SActive field of the received Set Device Bits FIS. The value returned in the SActive field of the SDB FIS shall have ones encoded in the bit positions corresponding to the bits that are to be cleared in the SActive register. |
| BM_START | 1 b | R/W | Busmaster start/stop bit. A value 1 means the programmed DMA context |

TABLE 1-continued

| Field Name | Size | R/W | Usage |
|---|---|---|---|
| | | | is valid and a value 0 means the DMA context is not valid. SATA host controller 140 should only DMA to/from system memory 110 when this bit is 1. |

The first four rows of Table 1 describe interrupts that may be generated by SATA host controller 140. The fifth row is a field for masking the interrupts. The Tag, D, I, Buffer-Offset, and Transfer_Count fields are received from a disk and are included within a DMA Setup FIS. The fields are stored in NCQ registers 135 to be read by device driver 112 in response to a transfer DMA setup request interrupt. The SActive field is required by the SATA II specification and indicates the status of each queued command, where each queued command is referenced by a corresponding tag.

Figure 3A:
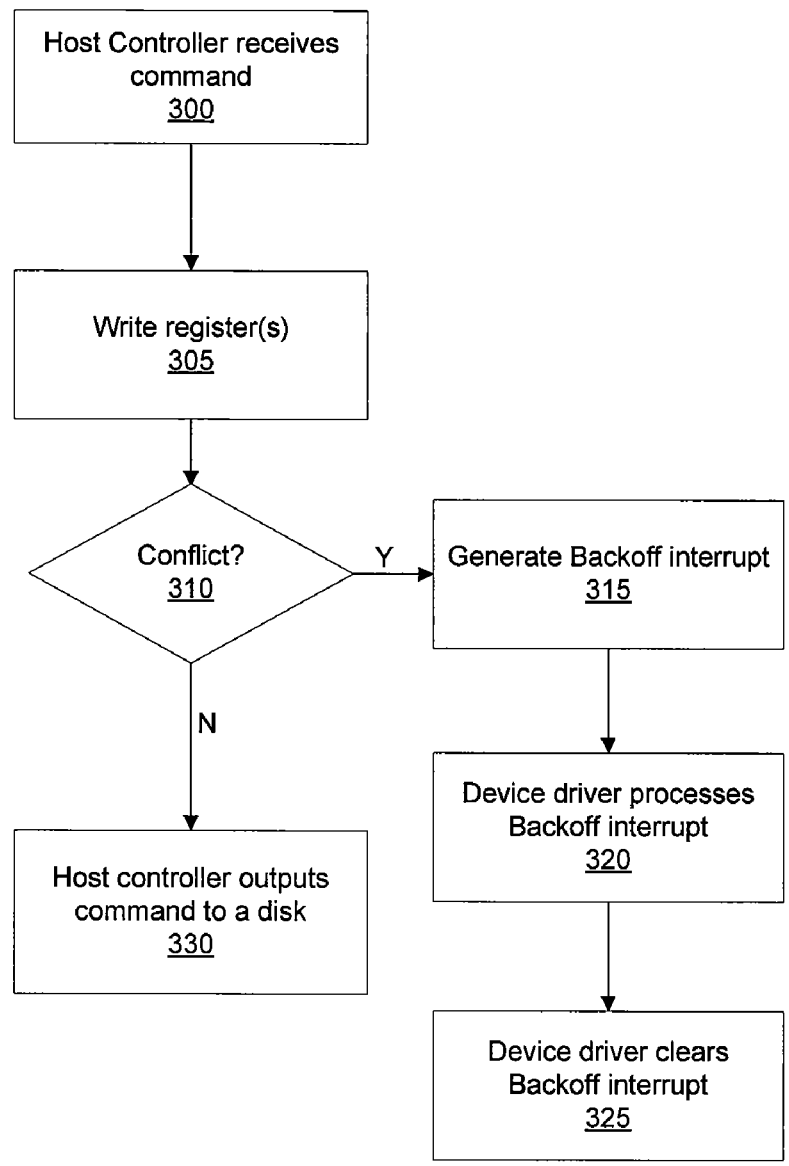
FIG. 3A is an exemplary embodiment of a method of performing command queuing of disk commands in accordance with one or more aspects of the present invention.

FIG. 3A is an exemplary embodiment of a method of performing command queuing of disk commands in accordance with one or more aspects of the present invention. In step 300 SATA host controller 140 receives a command from device driver 112. In step 305 SATA host controller 140 writes the shadow registers in NCQ registers 135. In step 310 SATA host controller 140 determines if a conflict exists on SATA bus 145 that prevents the disk targeted by the command from receiving the command. If, in step 310, SATA host controller 140 determines that a conflict does not exist, then in step 330 SATA host controller 140 outputs the command to the disk and the command is successfully queued.

If, in step 310, SATA host controller 140 determines that a conflict does exist, then in step 315 SATA host controller 140 generates a backoff interrupt. In step 320 device driver 112 receives the backoff interrupt indicating that the command was not successfully queued and should be reissued. In step 325 device driver 112 clears the backoff interrupt in NCQ registers 135 (TX_BACKOUT).

Figure 3B:
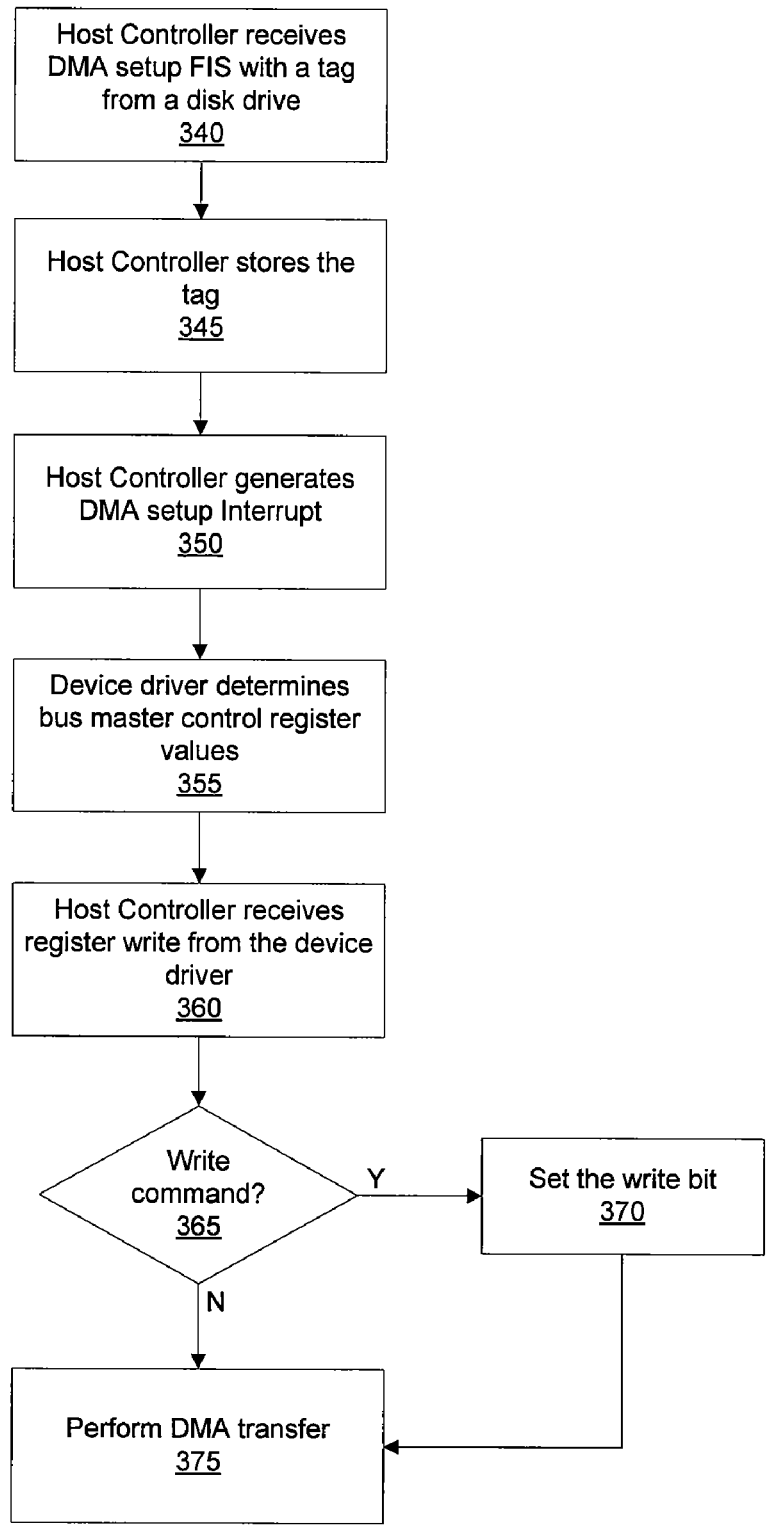
FIG. 3B is an exemplary embodiment of a method of completing execution of queued disk commands in accordance with one or more aspects of the present invention.

FIG. 3B is an exemplary embodiment of a method of completing execution of queued commands in accordance with one or more aspects of the present invention. In step 340 SATA host controller 140 receives a DMA setup FIS with a tag corresponding to a queued command from a disk, such as disk 150 of 155. In step 345 SATA host controller 140 stores the tag and other fields in the DMA setup FIS in NCQ registers 135. In step 350 SATA host controller generates a DMA transfer context request interrupt.

In step 355 device driver 112 determines the bus master control register values in response to receiving the DMA transfer context request interrupt. Specifically, device driver 112 reads the tag stored in NCQ registers 135 that corresponds to the queued command being processed by the disk. In step 360 device driver 112 programs the bus master control register values by writing registers in NCQ registers 135. Device driver 112 also writes the bus master start/stop bit in NCQ registers 135 to indicate that the DMA transfer context for the queued command has been programmed in SATA host controller 140.

In step 365 SATA host controller 140 determines if the command is a write command, and, if so, in step 370 SATA host controller 140 asserts the write bit for the DMA transfer. If, in step 365, SATA host controller 140 determines that the command is not a write command, i.e., the command is a read command, then SATA host controller 140 proceeds directly to step 375. In step 375 SATA host controller 140 performs the DMA transfer to complete processing of the queued command. When the command is a write command, data is transferred from system memory 110 to the disk. When the command is a read command, data is transferred from the disk to system memory 110.

Persons skilled in the art will appreciate that any system configured to perform the method steps of FIG. 3A or 3B or their equivalents, is within the scope of the present invention. Offloading storing and maintaining of the DMA context for each queued command from SATA host controller 140 to device driver 112 reduces the die area of SATA host controller since it does not need to store and maintain state for more than a single queued command. Therefore, SATA host controller 140 may provide a lower cost solution that a conventional host controller while still supporting native command queuing. Furthermore, the interface for programming the DMA transfer context for SATA host controller 140 may be compatible with the interface used for programming parallel ATA registers.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method for performing disk transfers using a native command queuing protocol, the method comprising:
    receiving a direct memory access (DMA) transfer context interrupt from a host controller indicating that a DMA transfer context is needed for a queued command;
    reading a first native command queuing register within the host controller that stores a tag that identifies the queued command;
    based on the tag, retrieving one or more bus master control register values that include DMA transfer context information corresponding to the queued command from system memory; and
    writing the one or more bus master control register values to a second native command queuing register within the host controller, wherein the host controller performs a DMA transfer context based on the one or more bus mater control register values written to the second native command queuing register.

2. The method of claim 1, further comprising the steps of:
    generating a first party direct memory access (FPDMA) command specifying a disk transfer between the disk and system memory; and
    receiving an interrupt from the host controller indicating that the FPDMA command could not be queued.

3. The method of claim 2, further comprising the steps of:
    clearing the interrupt; and
    reissuing the FPDMA command to the host controller.

4. The method of claim 2, further comprising the step of clearing the DMA transfer context interrupt.

5. A computer-readable medium storing instructions that, when executed by a computing device, cause the computing device to perform disk transfers using a native command queuing protocol, by performing the steps of:
    receiving a direct memory access (DMA) transfer context interrupt from a host controller indicating that a DMA transfer context is needed for a queued command;

reading a first native command queuing register within the host controller that stores a tag that identifies the queued command;

based on the tag, retrieving one or more bus master control register values that include DMA transfer context information corresponding to the queued command from system memory; and writing the one or more bus master control register values to a second native command queuing register within the host controller, wherein the host controller performs a DMA transfer context based on the one or more bus mater control register values written to the second native command queuing register.

6. The computer-readable medium of claim 5, further comprising the steps of:

generating a first party direct memory access (FPDMA) command specifying a disk transfer between the disk and system memory; and receiving an interrupt from the host controller indicating that the FPDMA command could not be queued.

7. The computer-readable medium of claim 6, further comprising the steps of:

clearing the interrupt; and reissuing the FPDMA command to the host controller.

8. The computer-readable medium of claim 6, further comprising the step of clearing the DMA transfer context interrupt.

9. A system for performing disk transfers using a native command queuing protocol, the system comprising:

a system memory;

a disk configured to process a queued command according to the native command queuing protocol, wherein the queued command specifies a transfer of a portion of data between the system memory and the disk; and a host controller coupled to the disk and the system memory, wherein the system memory is configured to store the portion of the data and a host controller device driver that is configured to:

receive a direct memory access (DMA) transfer context interrupt from the host controller indicating that a DMA transfer context is needed for a queued command, read a first native command queuing register within the host controller that stores a tag that identifies the queued command;

based on the tag, retrieving one or more bus master control register values that include DMA transfer context information corresponding to the queued command from system memory; and writing the one or more bus master control register values to a second native command queuing register within the host controller, wherein the host controller performs a DMA transfer context based on the one or more bus mater control register values written to the second native command queuing register.

10. The system of claim 9, wherein the host controller is configured to transmit a backoff interrupt to the host controller device driver indicating that a backoff condition exists when a disk transfer command is received from the host controller device driver and cannot be output to the disk.

11. The system of claim 10, wherein the host controller device driver is further configured to reissue the disk transfer command when the backoff interrupt is received from the host controller.

12. The system of claim 9, wherein the DMA transfer context interrupt is received when the host controller receives a DMA Setup frame information structure (FIS) from the disk.

13. The system of claim 9, further comprising native command queuing registers configured to store values received from a disk in a DMA Setup frame information structure (FIS).

14. The system of claim 9, wherein the host controller device driver is also configured to write a bus master start/stop bit responsive to receiving the direct memory access (DMA) transfer context for the queued command.

* * * * *